(12) United States Patent
Kim

(10) Patent No.: US 8,915,639 B2
(45) Date of Patent: Dec. 23, 2014

(54) LIGHTING SYSTEM INCLUDING A PROJECTION AND DISPLAY DEVICE WITH THE PROJECTION

(75) Inventor: Moon Jeong Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 204 days.

(21) Appl. No.: 13/396,108

(22) Filed: Feb. 14, 2012

(65) Prior Publication Data

US 2013/0003353 A1    Jan. 3, 2013

(30) Foreign Application Priority Data

Jun. 30, 2011 (KR) .................. 10-2011-0064747

(51) Int. Cl.
*F21V 7/04* (2006.01)
*F21V 8/00* (2006.01)

(52) U.S. Cl.
CPC ............ *G02B 6/0021* (2013.01); *G02B 6/0028* (2013.01); *G02B 6/0068* (2013.01); *G02B 6/0073* (2013.01); *G02B 6/008* (2013.01)
USPC .............. 362/616; 362/615; 362/613; 349/62

(58) Field of Classification Search
CPC .. G02B 6/0016; G02B 6/0021; G02B 6/0068; G02B 6/0073; G02F 11/133603
USPC .......... 362/612–613, 615, 23.09, 23.1, 23.16, 362/23.17, 97.1–97.3, 610, 616; 349/62
See application file for complete search history.

(56) References Cited

U.S. PATENT DOCUMENTS

| | | | |
|---|---|---|---|
| 6,523,966 B1 * | 2/2003 | Satoh et al. .................... | 362/601 |
| 7,458,709 B2 * | 12/2008 | Lang et al. ..................... | 362/612 |
| 8,113,704 B2 * | 2/2012 | Bae et al. ....................... | 362/613 |
| 8,220,981 B2 * | 7/2012 | Bae et al. ....................... | 362/613 |
| 8,279,373 B2 * | 10/2012 | Sano et al. ....................... | 349/65 |
| 8,360,592 B2 * | 1/2013 | Chung et al. ................. | 362/97.1 |
| 8,556,492 B2 * | 10/2013 | Joung et al. ................... | 362/616 |
| 8,646,932 B2 * | 2/2014 | Lee et al. ..................... | 362/97.3 |
| 2001/0017774 A1 | 8/2001 | Ito et al. | |
| 2003/0095399 A1 | 5/2003 | Grenda et al. | |
| 2009/0290097 A1 * | 11/2009 | Kim et al. ...................... | 349/65 |
| 2010/0232138 A1 | 9/2010 | Tsai | |
| 2010/0237359 A1 | 9/2010 | Cornelissen et al. | |
| 2011/0012942 A1 | 1/2011 | Kim et al. | |
| 2011/0026269 A1 | 2/2011 | Oh | |

FOREIGN PATENT DOCUMENTS

WO    WO 2008/102297 A1    8/2008

* cited by examiner

*Primary Examiner* — Robert May
(74) *Attorney, Agent, or Firm* — Birch, Stewart, Kolasch & Birch, LLP

(57) ABSTRACT

A lighting system including a light guide plate having a groove, a light source module arranged in the groove, and a projection from a side of the groove in the light guide plate toward the light source module for guiding a light from the light source module to the light guide plate.

20 Claims, 14 Drawing Sheets

LIGHTING SYSTEM INCLUDING A PROJECTION AND DISPLAY DEVICE WITH THE PROJECTION

CROSS REFERENCE TO RELATED APPLICATION

This application claims priority under 35 U.S.C. §119 to Korean Patent Application No. 10-2011-0064747, filed in Korea on Jun. 30, 2011, which is hereby incorporated in its entirety by reference as if fully set forth herein.

TECHNICAL FIELD

Embodiments relate to a backlight unit and a display device with the same.

BACKGROUND

In typical large sized display devices, there are LCD (Liquid Crystal Display device) and PDP (Plasma Display Panel).

Different from the PDP which is a spontaneous emission type, the LCD, having no light emitting device for itself, requires a separate backlight unit, essentially.

Depending on a position of a light source, in the backlight units used in the LCD, there are an edge lighting type backlight unit and a direct lighting type backlight unit. The edge lighting type backlight unit has the light source arranged at left/right sides or upper/lower sides of an LCD panel, for diffusing a light throughout the panel uniformly to have good uniformity of the light and to enable to fabricate a thin panel.

The direct lighting type, a technology generally applied to a display device larger than 20", has a plurality of light sources arranged under the panel, to have better light efficiency than the edge lighting type, finding its application to a large sized display device which requires high brightness.

As the light source for the related art edge lighting type or the direct lighting type, CCFL (Cold Cathode Fluorescent Lamp) has been used.

However, the backlight unit of the CCFL has drawbacks in that a substantial amount of power is consumed by the CCFL, a poor color reproduction ratio is poor to be about 70% of the CRT, and environmental pollution is caused by mercury added thereto.

In order to resolve above problems, as a substitute for the CCFL, active researches on a backlight unit of LED (Light Emitting Diode) are being made.

The backlight unit of LED enables partial turn on/off of an LED array permitting significant reduction of power consumption, and to provide color reproduction exceeding 100% of the color reproduction range specification of the NTSC (National Television System Committee) allowing providing an excellent picture quality to the consumers.

SUMMARY

Accordingly, the present invention is directed to a backlight unit and a display device with the same.

An object of the present invention is to provide a backlight unit and a display device with the same, in which a projection is formed in a groove in a light guide plate for reducing shadow at a region adjacent to a light source module.

To achieve these objects and other advantages and in accordance with the purpose of the invention, as embodied and broadly described herein, a backlight unit includes a light guide plate having a groove, a light source module arranged in the groove, and a projection from a side of the groove in the light guide plate toward the light source module for guiding a light from the light source module to the light guide plate.

In this instance, the light guide plate and the projection may be formed of the same material as one unit, or the light guide plate and the projection may be formed of materials different from each other, separately.

The light guide plate and the projection may be formed of any one of PMMA (Polymethylmethacrylate), PET (polyethylene terephthlate), COC(Cyclic Olefin Copolymers), PEN (polyethylene naphthalate), PC (Polycarbonate), PS (Polystyrene), and MS (Mathacylate styrene).

And, the projection may be projected from a side of the groove toward the light source module by 1~10 mm.

In this instance, the projection may have a length which becomes the shorter as a distance between the light sources of the light source module becomes the shorter, and vice versa.

The projection may have an upper side sloped from a horizontal plane by a first angle, and the projection may have an underside sloped from a horizontal plane by a second angle, wherein the first angle and the second angle may be different from each other.

At least one of the upper side and the underside of the projection may be a flat surface vertical to the side of the groove, or a sloped surface sloped by a predetermined angle from the side of the groove.

And, the upper side and the underside of the projection are parallel to each other.

The projection may include a first side facing the light source module and a second side facing a side of the groove, wherein the first side has an area smaller than an area of the second side.

In this instance, the first side of the projection may have a height higher than a height of the light source of the light source module, and the first side of the projection may be spaced from, or in contact with, the light source of the light source module.

And, a ratio of a height of the second side of the projection to a height of the groove in the light guide plate may be 1:1~3.

And, a ratio of the height of the groove in the light guide plate to a thickness of the light guide plate 0.3~0.9:1.

The backlight unit may further include a reflector arranged on at least one of the upper side of the projection, the substrate of the light source module, and an inside of the groove in the light guide plate.

The light source module may include a substrate for arranging light sources thereon, and the substrate is positioned on an underside of the projection.

And, the backlight unit may further include a stopper arranged in the groove in the light guide plate for fastening the light source module thereto.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Hereinafter, embodiments will be described with reference to the annexed drawings.

It will be understood that when an element is referred to as being 'on' or "under" another element, it can be directly on/under the element, and one or more intervening elements may also be present. When an element is referred to as being 'on' or 'under', 'under the element' as well as 'on the element' can be included based on the element.

Figure 1:
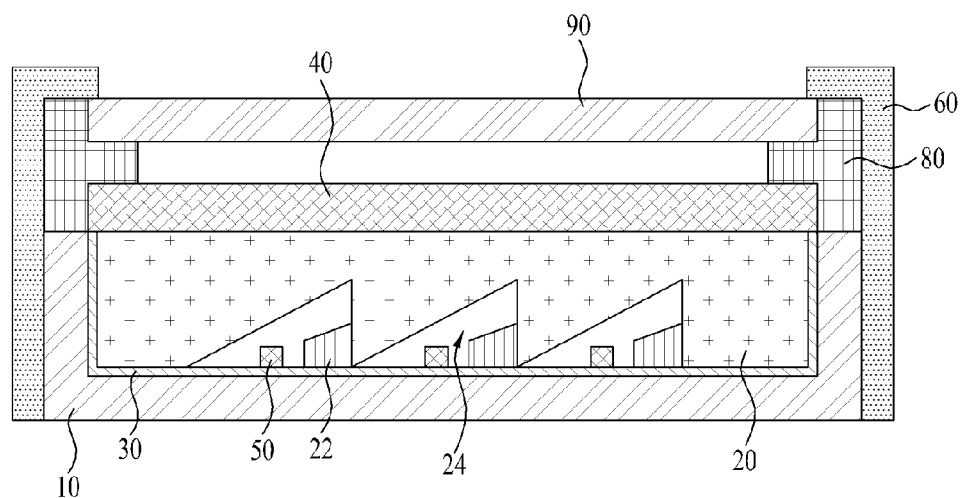
FIG. 1 illustrates a section of a backlight unit in accordance with one embodiment.

FIG. 1 illustrates a section of a backlight unit in accordance with one embodiment.

Referring to FIG. 1, the backlight unit may include a light guide plate 20, a projection 22, a reflector 30, an optical member 40, and a light source module 50.

And, the backlight unit may further include a top chassis 60, a bottom chassis 10, and a panel guide module 80.

The panel guide module 80 may support a display panel 90, and the top chassis 60 may be connected to the panel guide module 80 and the bottom chassis 10.

The light guide plate 20 may have an underside surface with at least a groove 24 formed therein, and an upper surface with the optical member 40 arranged thereon.

The groove 24 in the light guide plate 20 may have a triangular, rectangular, or trapezoidal cross section.

As an example, if the groove 24 in the light guide plate 20 has a triangular cross section, of first and second sides facing each other and meet at a peak point, the first side of the groove 24 may be vertical to a horizontal plane which is parallel to the upper surface of the light guide plate 20, and the second side of the groove 24 may be sloped from the horizontal plane which is parallel to the upper surface of the light guide plate 20.

In this instance, the facing first and second sides may form an angle of about 30~120 degrees.

As another example, if the groove 24 in the light guide plate 20 has a trapezoidal cross section, of the first and second sides facing each other, the first side of the groove 24 may be vertical to an underside of the groove 24, and the second side of the groove 24 may be sloped from the underside of the groove 24.

Or, if the groove 24 in the light guide plate 20 has a trapezoidal cross section, of the first and second sides facing each other may be sloped from the underside of the groove 24, with a slope angle between the first side of the groove 24 and the underside of the groove 24 smaller than a slope angle between the second side of the groove 24 and the underside of the groove 24.

A ratio of height of the groove 24 of the light guide plate 20 to a total thickness of the light guide plate 20 may be about 0.3~0.7:1.

The projection 22 is projected from the side of the groove 24 in the light guide plate 20 toward the light source module 50 for guiding the light from the light source module 50 to the light guide plate 20.

In this instance, the light guide plate 20 and the projection 22 may be formed of the same material as one unit.

Depending on cases, the light guide plate 20 and the projection 22 may be formed separately of materials different from each other.

The light guide plate 20 and the projection 22 may be formed of any one selected from a group of materials including an acryl resin group, such as PMMA (Polymethylmethacrylate), PET (polyethylene terephthlate), COC(Cyclic Olefin Copolymers), PEN (polyethylene naphthalate), PC (Polycarbonate), PS (Polystyrene) and MS (Mathacylate styrene) resin.

The projection 22 may be projected from the side of the groove 24 toward the light source module 50 by about 1~10 mm.

The projection 22 may have a length which becomes the shorter as a distance between the light sources of the light source module 50 becomes the shorter, and vice versa.

The projection 22 is formed under reasons which will be described, later.

The light source module 50 may be arranged in the groove 24 in the light guide plate 20.

The light source module 50 may include a substrate and at least one light source arranged on the substrate, both of which may be arranged in the groove 24 in the light guide plate 20.

Depending on cases, the substrate may be arranged on an outside of the groove 24 of the light guide plate 20, and the light source may be arranged in the groove 24 in the light guide plate 20.

The substrate may have an electrode pattern formed thereon for making electric connection to the light source, and may be a PCB (Printed Circuit Board) substrate or a film of a material selected from PET, glass, PC, and Si.

Moreover, the substrate may be one selected from a single layered PCB, a multiple layered PCB, a ceramic PCB, and a metal core PCB.

At least one light source may be arranged on the substrate, and the light source may be a side view type light emitting diode.

Depending on cases, the light source may be a top view type light emitting diode.

Thus, the light source may be an LED chip of a blue LED chip, a UV LED chip, or at least one, or a package having a combination, of a red LED chip, a green LED chip, a blue LED chip, a yellow LED chip, and white LED chip.

In this instance, the white LED may be embodied by a combination of yellow phosphor on the blue LED, or a combination of red phosphor and green phosphor on the blue LED at a time, or a combination of yellow phosphor, red phosphor, and green phosphor on the blue LED at a time.

The reflector 30 may be arranged on the underside of the light guide plate 20.

That is, the reflector 30 may be arranged between the light guide plate 20 and the bottom chassis 10 extended to the sides of the light guide plate 20.

In this instance, the reflector 30 may, or may not, be formed on an underside of the light source module 50.

And, the reflector 30 may also formed on at least one of the side of the groove 24 in the light guide plate 20, an upper side of the projection 22, and the substrate of the light source module 50.

The reflector 30 may include at least one of metal or metal oxide having high reflectivity, for an example, Al, Ag, Au, or $TiO_2$.

The optical member 40 may be arranged on the upper side of the light guide plate 20.

The optical member 40, provided for diffusing the light from the light guide plate 20, may have a roughness pattern formed on a surface of the upper side for increasing a diffusing effect.

And, the optical member 40 may have multiple layers with the roughness pattern on a surface of an uppermost layer, or a surface of any one layer.

The roughness pattern may be a stripe pattern arranged along the light source module 50.

Depending on cases, the optical member 40 may be at least one sheet selectively including a diffusion sheet, a prism sheet, and a brightness enhancing sheet.

The diffusion sheet diffuses the light from the light source, the prism sheet guides the light diffused thus to a light emitting region, and the brightness enhancing sheet enhances brightness.

Figure 2:
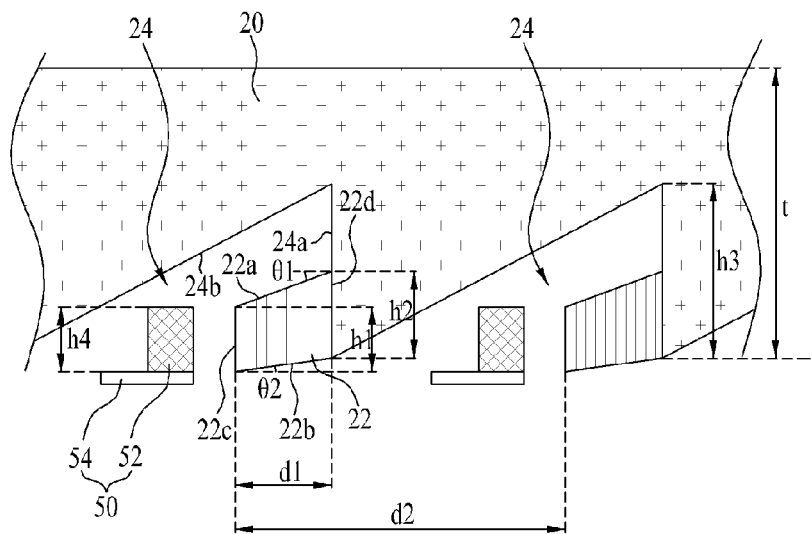
FIG. 2 illustrates a section showing a position of the projection in FIG. 1, in detail.

FIG. 2 illustrates a section showing a position of the projection in FIG. 1, in detail.

FIG. 2 illustrates an embodiment suggesting a triangular cross section of the groove 24 in the light guide plate 20, having first and second sides 24a and 24b which face each other and meet at a peak point, wherein the first side 24a of the groove 24 may be vertical to a horizontal plane parallel to an upper side of the light guide plate 20, and the second side 24b of the groove 24 may be sloped from the horizontal plane which is parallel to the upper side of the light guide plate 20.

The projection 22 is projected from the first side 24a of the groove 24 in the light guide plate 20 toward the light source module 50 for guiding the light from the light source module 50 to the light guide plate 20.

The projection 22 has an upper side 22a, an underside 22b, and first and second sides 22c and 22d, wherein the upper side 22a of the projection 22 may be sloped from the horizontal plane which is parallel to the upper side of the light guide plate 20 by a first angle θ1, and the underside 22b of the projection 22 may be sloped from the horizontal plane which is parallel to the upper side of the light guide plate 20 by a second angle θ2.

In this instance, the first angle θ1 of the upper side 22a of the projection 22 may be larger than the second angle θ2 of the underside 22b of the projection 22.

For an example, the first angle θ1 of the upper side 22a of the projection 22 may be about 5~10 degrees, and the second angle θ2 of the underside 22b of the projection 22 may be about 1~2 degrees.

Depending on cases, at least one of the upper side 22a and the underside 22b of the projection 22 may be a flat surface vertical to the first side 24a of the groove 24 or a sloped surface sloped from the first side 24a of the groove 24 by a predetermined angle.

As another case, the upper side 22a and the underside 22b of the projection 22 may be parallel to each other.

And, the projection 22 includes a first side 22c facing the light source module 50 and a second side 22d facing the first side 24a of the groove 24, wherein the first side 22c of the projection 22 may be in contact with, or spaced from, the light source module 50, and the second side 22d of the projection 22 may be in contact with the first side 24a of the groove 24.

The first side 22c of the projection 22 may have an area smaller than an area of the second side 22d of the projection 22.

The projection 22 may have a length, i.e., a distance d1 between the first side 22c of the projection 22 and the second side 22d of the projection 22, of about 1~10 mm.

In this instance, the length of the projection 22 becomes the shorter as the distance between the light sources in the light source module 50 becomes the shorter, and vice versa.

And, a distance d2 between the first sides 22c of the projections 22 in the grooves 24 adjacent to each other may be 50~100 mm.

The first side 22c of the projection 22 may have a height h1 lower than a height h2 of the second side 22d of the projection 22.

Depending on cases, the height h1 of the first side 22c of the projection 22 may be the same with the height h2 of the second side 22d of the projection 22.

A ratio of the height h1 of the first side 22c of the projection 22 to the height h2 of the second side 22d of the projection 22 may be 1:1~3.

The height h1 of the first side 22c of the projection 22 may be the same with a height h4 of the light source 52 of the light source module 50.

For an example, the height h1 of the first side 22c of the projection 22 may be about 1~2 mm, and the height h4 of the light source 52 of the light source module 50 may be about 0.5~2 mm.

In this instance, the first side 22c of the projection 22 may be spaced from, or in contact with, the light source 52 of the light source module 50.

And, a ratio of the height h2 of the second side 22d of the projection 22 to a height h3 of the groove 24 in the light guide plate 20 may be 1:1~3.

And, a ratio of the height h3 of the groove 24 in the light guide plate 20 to a thickness t1 of the light guide plate 20 may be 0.3~0.9:1.

For an example, if the thickness t1 of the light guide plate 20 is about 5~6 mm, the height h3 of the groove 24 may be about 4~5 mm.

The projection 22 is formed in the groove 24 in the light source module 50 thus under the following reason.

Figure 3A:
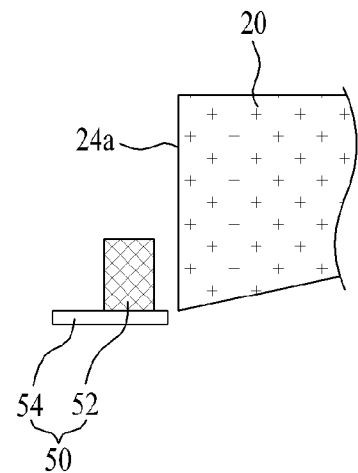
FIGS. 3A and 3B illustrate schematic views showing diffusing of a light incident on a light guide plate having no projection.
Figure 3B:
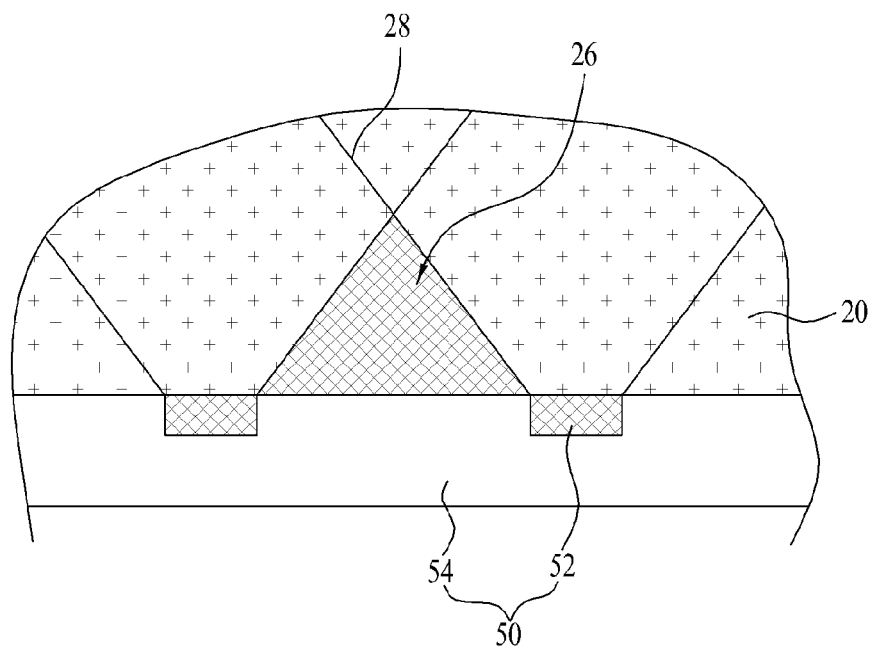
Figure 4A:
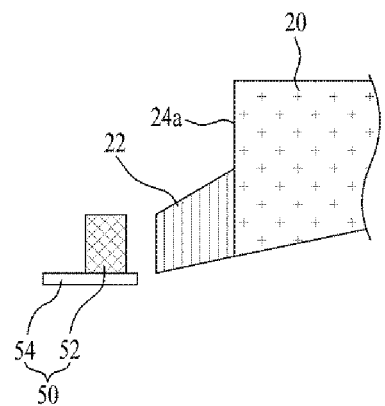
FIGS. 4A and 4B illustrate schematic views showing diffusion of a light incident on a light guide plate having a projection.
Figure 4B:
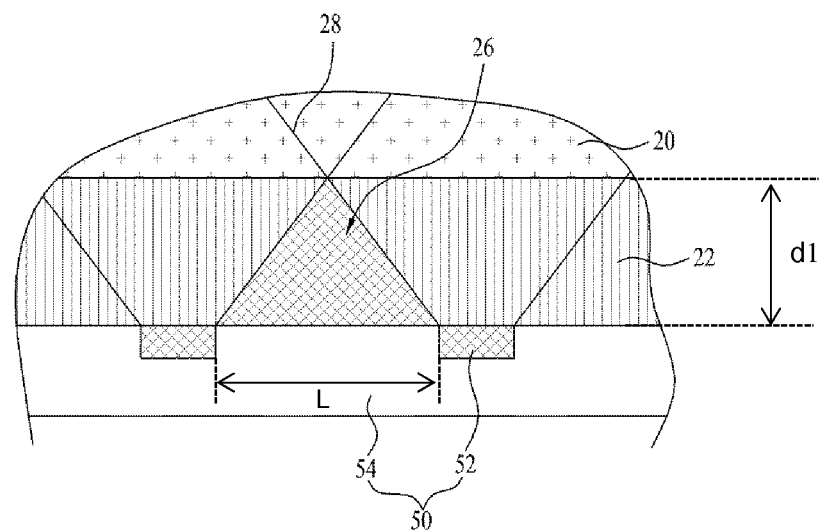

FIGS. 3A and 3B illustrate schematic views showing diffusion of a light incident on a light guide plate having no projection, and FIGS. 4A and 4B illustrate schematic views showing diffusion of a light incident on a light guide plate having a projection.

FIGS. 3A and 4A illustrate sections showing the sides of the light guide plates respectively, and FIGS. 3B and 4B illustrate plan views showing upper sides of the light guide plates, respectively.

Referring to FIGS. 3A and 3B, the light source module 50 is arranged on a first side 24a of the groove 24, wherein the light guide plate 20 having no projection, wherein the light source module 50 may have a plurality of light sources 52 arranged on a substrate 54 thereof spaced from each other.

Upon incident on the light guide plate 20, the light 28 from each of the light sources 52 spreads and diffuses in the light guide plate 20, forming a shadow 26 in the light guide plate 20 between adjacent light sources 52.

The shadow 26 may appear at about 3~5 mm distances from a front of the second side 24b of the groove 24.

This is because the light sources 52 are spaced from each other and the light spreads, to form the shadow 26.

Therefore, referring to FIGS. 4A and 4B, the projection 22 is formed on the first side 24a of the groove 24, and the light source module 50 is arranged in front of the projection 22, for reducing the shadow.

This is because, since the projection 22 is arranged at a region the shadow 26 is formed to guide the light 28 to the light guide plate 20, the shadow 26 may not be formed in a light guide plate 20 region.

Thus, since the projection 22 is arranged at a region the shadow 26 is formed, the length d1 of the projection 22 may vary with an area of the shadow 26.

In conclusion, since the shadow 26 varies with the distance L between the light sources 52 in the light source module 50, the length d1 of the projection 22 becomes the shorter as the distance L between the light sources 52 in the light source module 50 becomes shorter, and vice versa.

FIGS. 5A~5D illustrate schematic views of various shapes of projections, respectively.

Figure 5A:
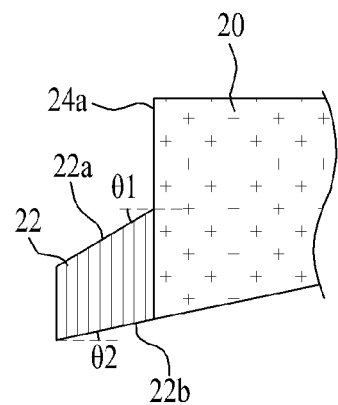
FIGS. 5A-5D illustrate schematic views of various shapes of projections, respectively.

Referring to FIG. 5A, the upper side 22a of the projection 22 may be sloped from a horizontal plane which is parallel to the upper side of the light guide plate 20 by a first angle θ1, and the underside 22b of the projection 22 may be sloped from the horizontal plane which is parallel to the upper side of the light guide plate 20 by a second angle θ2.

In this instance, the first angle θ1 of the upper side 22a of the projection 22 may be larger than the second angle θ2 of the underside 22b of the projection 22.

Figure 5B:
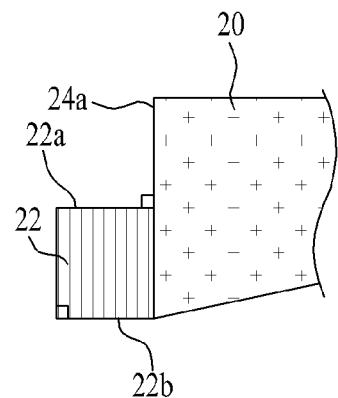

Referring to FIG. 5B, the upper side 22a and the underside 22b of the projection 22 may be flat surfaces vertical to the first side 24a of the groove 24, respectively.

In this instance, the upper side 22a and the underside 22b of the projection 22 may be parallel to each other.

Figure 5C:
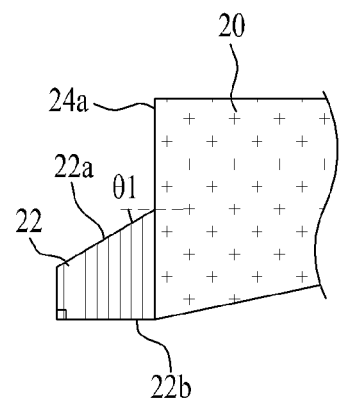

Referring to FIG. 5C, the upper side 22a of the projection 22 may be sloped from a horizontal plane which is parallel to the upper side of the light guide plate 20 by a first angle θ1, and the underside 22b of the projection 22 may be a flat surface which is vertical to the first side 24a of the of the groove 24.

Figure 5D:
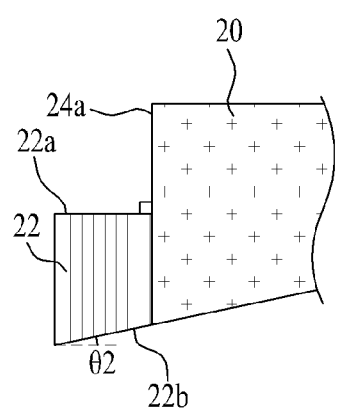

Referring to FIG. 5D, the upper side 22a of the projection 22 may be a flat surface which is vertical to the first side 24a of the groove 24, and the underside 22b of the projection 22 may be sloped from a horizontal plane which is parallel to the upper side of the light guide plate 20 by a second angle θ2.

Figure 6A:
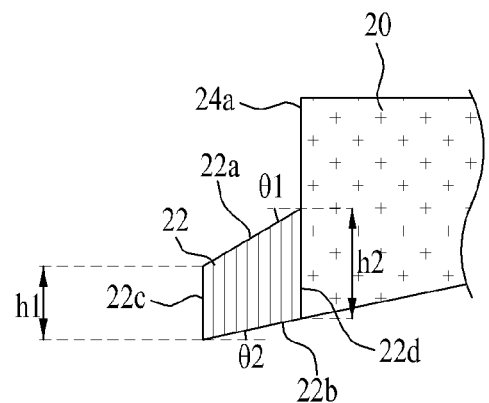
FIGS. 6A and 6B illustrate schematic views each showing comparison of heights of both sides of a projection.
Figure 6B:
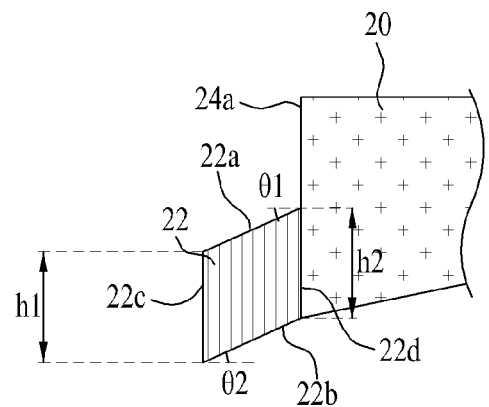

FIGS. 6A and 6B illustrate schematic views each showing comparison of heights of both sides of a projection, wherein FIG. 6A illustrates the projection having both sides with heights different from each other, and FIG. 6B illustrates the projection having both sides with the same heights.

Referring to FIG. 6A, the projection 22 includes the first side 22c facing the light source module and the second side 22d facing a side of the light guide plate 20, wherein the first side 22c may have a height h1 lower than a height h2 of the second side 22d.

And, the upper side 22a of the projection 22 and the underside 22b of the projection 22 may not be parallel to each other.

That is, the upper side 22a of the projection 22 may be sloped from a horizontal plane which is parallel to the upper side of the light guide plate 20 by a first angle θ1, and the underside 22b of the projection 22 may be sloped from the horizontal plane which is parallel to the upper side of the light guide plate 20 by a second angle θ2.

In this instance, the first angle θ1 of the upper side 22a of the projection 22 may be larger than the second angle θ2 of the underside 22b of the projection 22.

Referring to FIG. 6B, the projection 22 includes the first side 22c facing the light source module and the second side 22d facing a side of the light guide plate 20, wherein the first side 22c may have a height h1 the same with a height h2 of the second side 22d.

In this instance, the upper side 22a of the projection 22 and the underside 22b of the projection 22 may be parallel to each other.

That is, the upper side 22a of the projection 22 may be sloped from a horizontal plane which is parallel to the upper side of the light guide plate 20 by a first angle θ1, and the underside 22b of the projection 22 may be sloped from the horizontal plane which is parallel to the upper side of the light guide plate 20 by a second angle θ2.

In this instance, the first angle θ1 of the upper side 22a of the projection 22 may be the same with the second angle θ2 of the underside 22b of the projection 22.

Figure 7A:
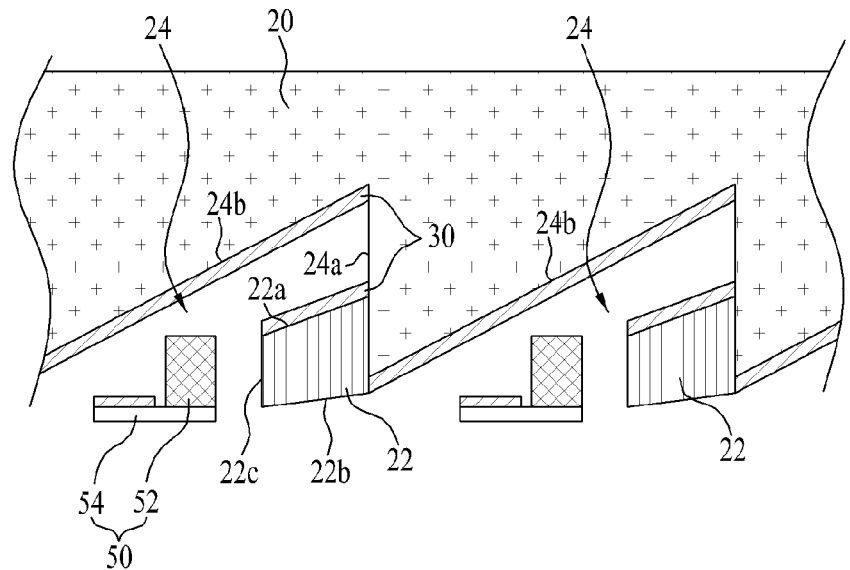
FIGS. 7A and 7B illustrate schematic views each showing reflectors in grooves in a light guide plate.
Figure 7B:
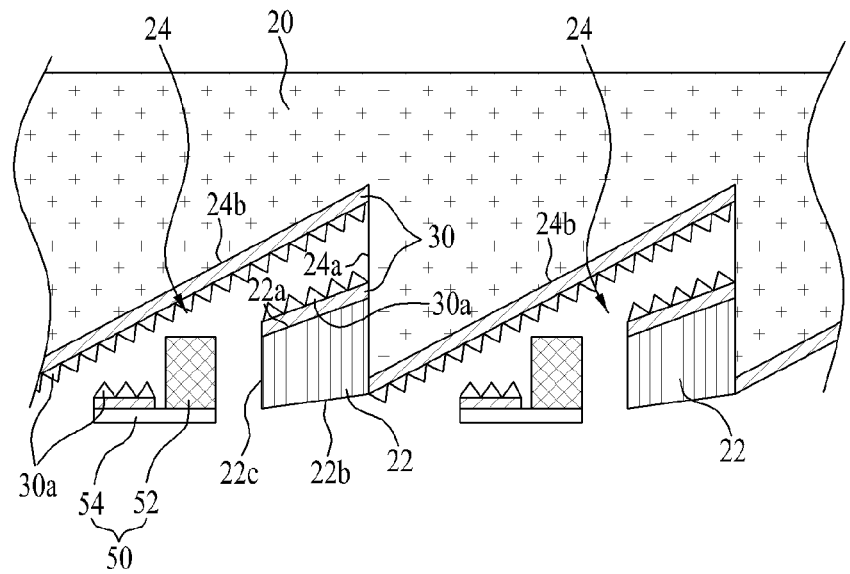

FIGS. 7A and 7B illustrate schematic views each showing reflectors in grooves 24 in a light guide plate, wherein FIG. 7A illustrates a section showing reflectors without the roughness pattern, and FIG. 7B illustrates a section showing reflectors each with the roughness pattern.

Referring to FIGS. 7A and 7B, the reflector 30 may be arranged at any one of the upper side 22a of the projection 22, the substrate 54 of the light source module 50, and an inside of the groove 24 in the light guide plate 20.

In this instance, though the reflector 30 may be arranged at the upper side 22a of the projection 22, the reflector 30 may not be arranged at the underside 22b of the projection 22.

This is because a small area of the reflector 30 arranged at the underside 22b may cause loss of an incident light.

Moreover, of the inside of the groove 24 in the light guide plate 20, the reflector 30 may be arranged at the second side 24, but may not be arranged at the first side 24a of the groove 24.

This is because a small area of the reflector 30 arranged at the first side 24a of the groove 24 may cause loss of an incident light.

Therefore, the reflector 30 may be arranged at least one of the upper side 22a of the projection 22, the substrate 54 of the light source module 50, and the second side 24b in the groove 24 in the light guide plate 20.

Referring to FIG. 7B, the reflector 30 may have the roughness pattern 30a on an upper surface for increasing a diffusion effect.

The roughness pattern 30a may have a triangular, rectangular, polygonal, or semi-spherical cross section.

Figure 8A:
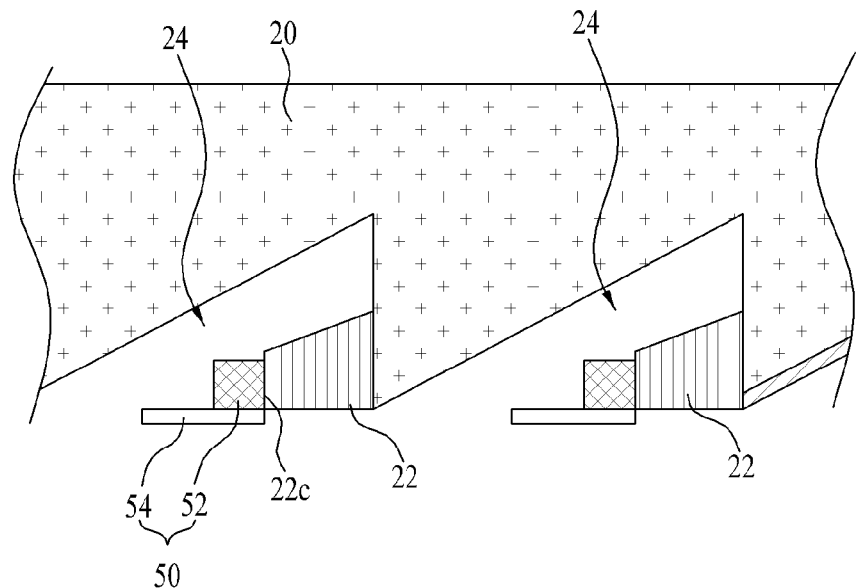
FIGS. 8A and 8B illustrate schematic views each showing a relative position between a projection and a light source module.
Figure 8B:
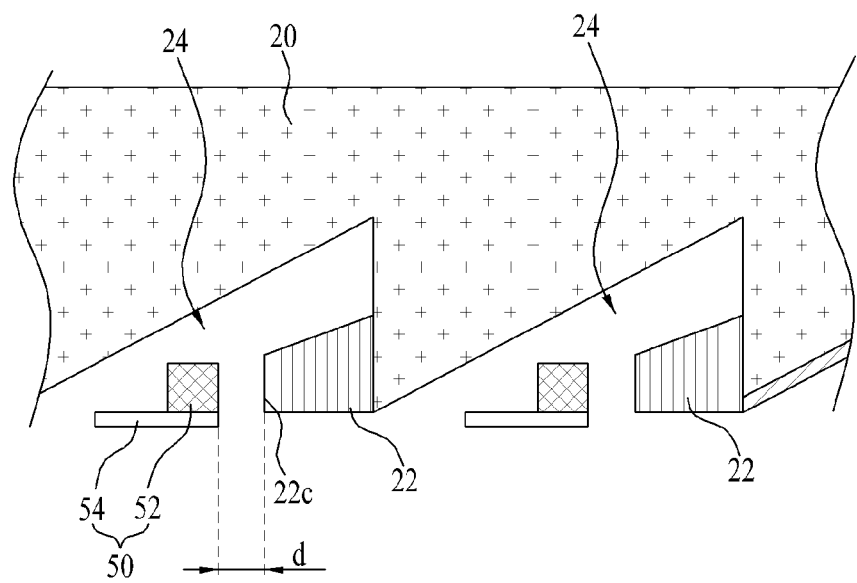

FIGS. 8A and 8B illustrate schematic views each showing a relative position between a projection and a light source module.

Referring to FIG. 8A, the light source module 50 may be in contact with the first side 22c of the projection 22.

The light source module 50 includes the substrate 54 and at least one light source 52 arranged on the substrate 54, wherein the light source 52 may be in contact with the first side 22c of the projection 22, and the substrate 54 may, or not be in contact with the first side 22c.

In this instance, the light source 52 has a light forwarding surface facing the first side 22c of the projection 22 such that the light is directed to the first side 22c of the projection 22.

Referring to FIG. 8B, the light source module 50 may be spaced a predetermined distance d from the first side 22c of the projection 22.

In this instance, the light source 52 has a light forwarding surface facing the first side 22c of the projection 22 such that the light is directed to the first side 22c of the projection 22.

Figure 9A:
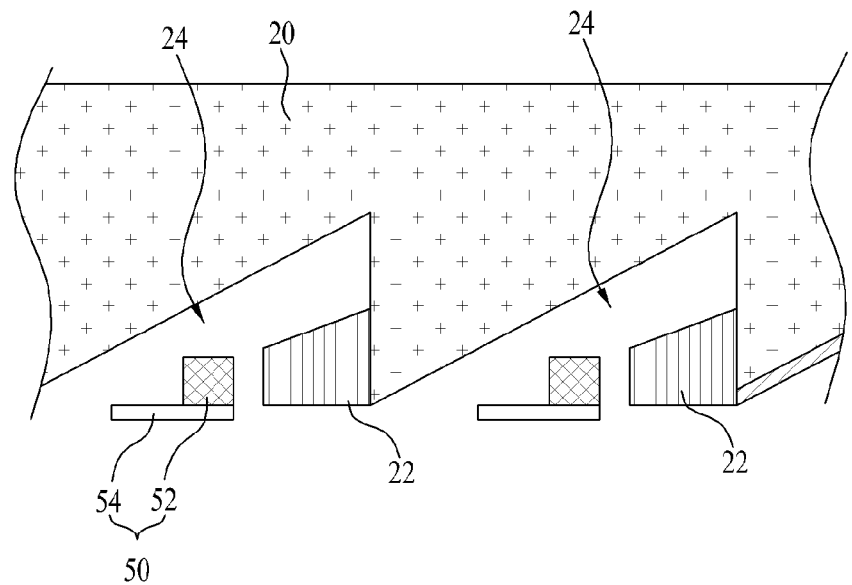
FIGS. 9A and 9B illustrate schematic views each showing a relative position between a projection and a substrate of a light source module.
Figure 9B:
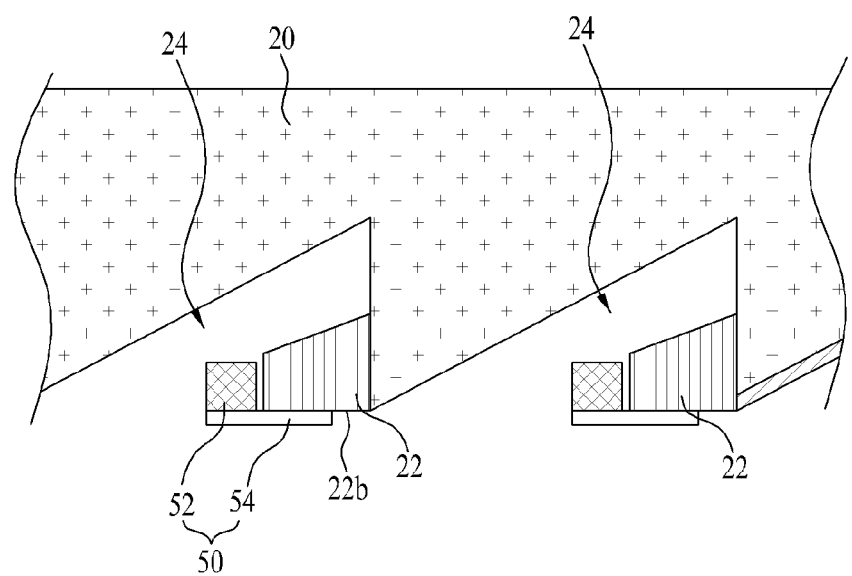

FIGS. 9A and 9B illustrate schematic views each showing a relative position between a projection and a substrate of a light source module.

Referring to FIG. 9A, the light source module 50 includes the substrate 54 and at least one light source 52 arranged on the substrate 54, wherein the light source 52 may be arranged on one side of the substrate 54, with the one side of the substrate 54 having the light source 52 arranged thereon arranged adjacent to the projection 22, and the other side of the substrate 54 having no light source 52 arranged thereon arranged opposite to the projection 22.

Depending on cases, referring to FIG. 9B, the substrate of the light source module 50 may be positioned on an underside 22b of the projection 22.

That is, the light source 52 may be arranged on one side of the substrate 54, with the one side of the substrate 54 having the light source 52 arranged thereon arranged adjacent to the projection 22, and the other side of the substrate 54 having no light source 52 arranged thereon arranged on the underside 22b of the projection 22.

If the substrate 54 is arranged on the underside 22b of the projection 22, enabling to form the groove 24 in the light guide plate 20 larger, space utilization of the groove 24 is easy, and a total thickness of the light guide plate 20 can be reduced.

Figure 10A:
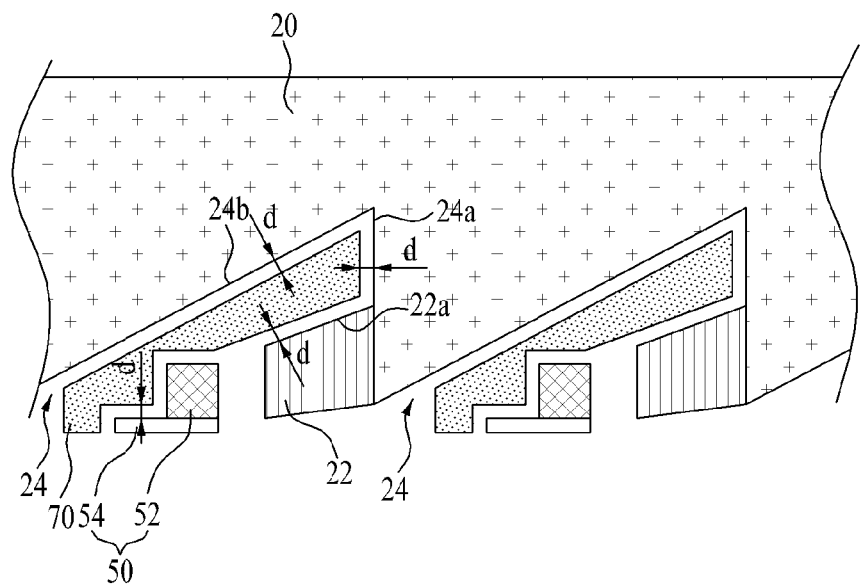
FIGS. 10A~10C illustrate sections each showing a stopper arranged in a groove in a light guide plate.
Figure 10B:
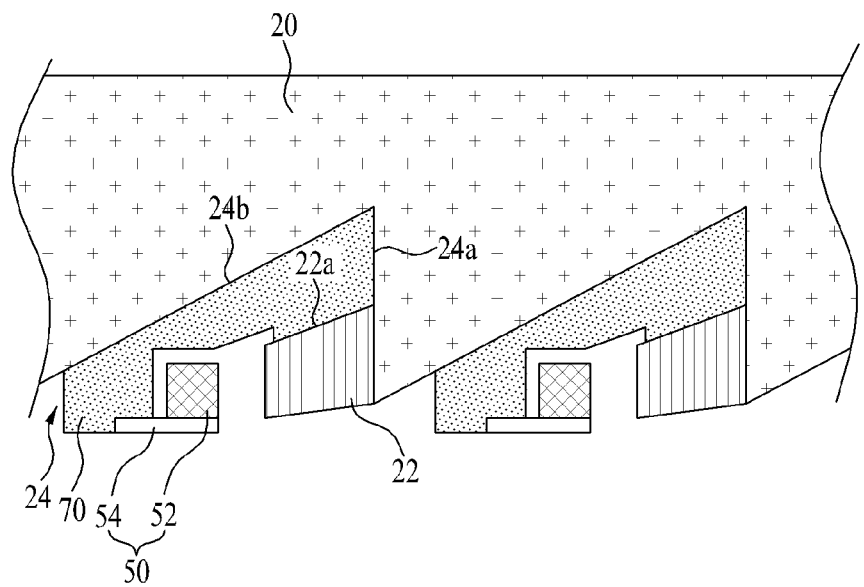
Figure 10C:
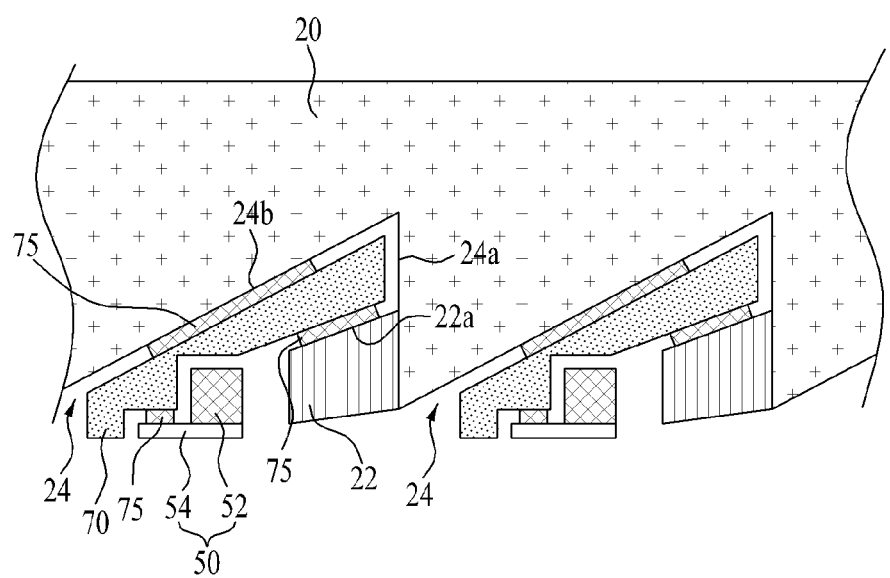

FIGS. 10A~10C illustrate sections each showing a stopper arranged in a groove in a light guide plate.

Referring to FIGS. 10A-10C, the stopper 70 is arranged in the groove 24 of the light guide plate 20 for fastening the light source module 50.

In this instance, referring to FIG. 10A, the stopper 70 may be spaced a distance d from the first and second sides 24a, and 24b of the groove 24, the upper side of the projection 22, and the substrate 54 of the light source module 50.

Or, referring to FIG. 10B, the stopper 70 may be in contact with at least one of the first and second sides 24a, and 24b of the groove 24, the upper side of the projection 22, and the substrate 54 of the light source module 50.

If the reflector 30 is arranged on the side of the groove 24, the stopper 70 may be in contact with the reflector 30.

And, the stopper 70 may be spaced from the light source 52 of the light source module 50 and may be in contact with the upper side and a side of the substrate 54 of the light source module 50, partially.

The stopper 70 may have a shape varied with shapes of the groove 24 in the light guide plate 20, and may be formed by injection molding of a polymer resin.

For an example, the stopper 70 may be formed of at lease one selected from a group including unsaturated polyester, methyl methacrylate, ethyl methacrylate, isobutyl methacrylate, normal butyl methacrylate, acrylic acid, methacrylic acid, hydroxyl ethyl methacrylate, hydroxyl propyl methacrylate, hydroxyl ethyl acrylate, acrylamide, ethyl acrylamide, isobutyl acrylamide, and normal butyl acrylamide.

Referring to FIG. 10C, the stopper 70 may be adhered to at least one of the second side 24b of the groove 24, the upper side 22a of the projection 22, and the substrate 54 of the light source module 50 with an adhesive 75.

The adhesive 75 may, or may not, be the same material.

The adhesive 75 may be any one of epoxy resin and silicon resin.

Thus, since the embodiments have the projection formed on the side of the groove in the light guide plate and the light source module arranged in front of the projection, enabling to remove the shadow which appears between the light sources, the embodiments can provide uniform brightness.

Figure 11:
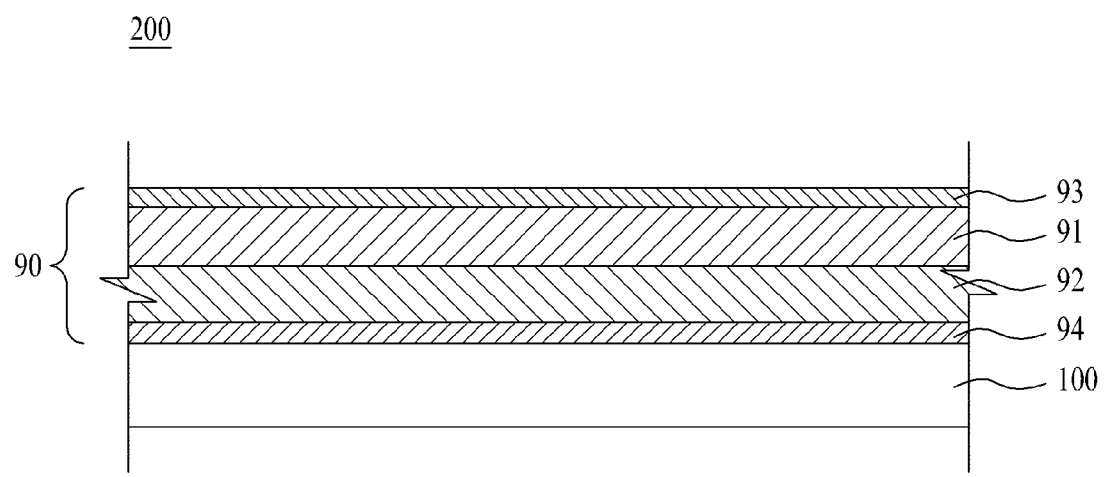
FIG. 11 illustrates a display module having a backlight unit in accordance with an embodiment.

FIG. 11 illustrates a display module having a backlight unit in accordance with an embodiment.

Referring to FIG. 11, the display module 200 may include a display panel 90 and a backlight unit 100.

The display panel 90 may include a color filter substrate 91 and a TFT (Thin Film Transistor) substrate 92 bonded to face each other to maintain a uniform cell gap therebetween, with a liquid crystal layer (Not shown) disposed therebetween.

The color filter substrate 91 includes a plurality of pixels each having red R, green G, and blue B sub-pixels each for producing a red, green or blue image upon application of a light thereto.

Though each of the pixels may have the red R, green G, and blue B sub-pixels, but not limited thereto, and each of the pixels may have may have the red R, green G, blue B, and white W sub-pixels.

The TFT substrate 92 has switching devices formed thereon for switching the pixel electrodes (Not shown).

For an example, a common electrode (Not shown) and a pixel electrode can vary orientation of liquid crystal molecules with a voltage applied thereto from an outside.

The liquid crystal layer has a plurality of liquid crystal molecules of which orientation is varied with a voltage difference between the pixel electrode and the common electrode.

Eventually, the light from the backlight unit 100 may be incident on the color filter substrate 91 matched to the variation of the orientation of the molecules of the liquid crystal layer.

And, the display panel 90 may have an upper polarizing plate 93 and a lower polarizing plate 94 arranged on and underside thereof, respectively. In more detail, the upper polarizing plate 93 may be arranged on the color filter substrate 91, and the lower polarizing plate 94 may be arranged on an underside of the TFT substrate 92.

Though not shown, there may be gate and data driving units on a side of the display panel 90 for generating driving signals required for driving the display panel 90.

Referring to FIG. 11, the display module 200 may have an arrangement in which the backlight unit 100 is arranged close to the display panel 90.

For an example, the backlight unit 100 may be fastened to an underside of the display panel 90, more specifically, to the underside of the lower polarizing plate with an adhesive. To do this, an adhesive layer (Not shown) may be formed between the lower polarizing plate 94 and the backlight unit 100.

Thus, by forming the backlight unit 100 close to the display panel 90, an exterior of the display device can be improved by reducing a total thickness thereof, and a structure and a fabrication process of the display device can be simplified by removing additional structures required for fastening the backlight unit 100.

And, by removing a space between the backlight unit 100 and the display panel 90, malfunction or a poor picture quality of the display device caused by infiltration of foreign matter into the space can be prevented.

Figure 12:
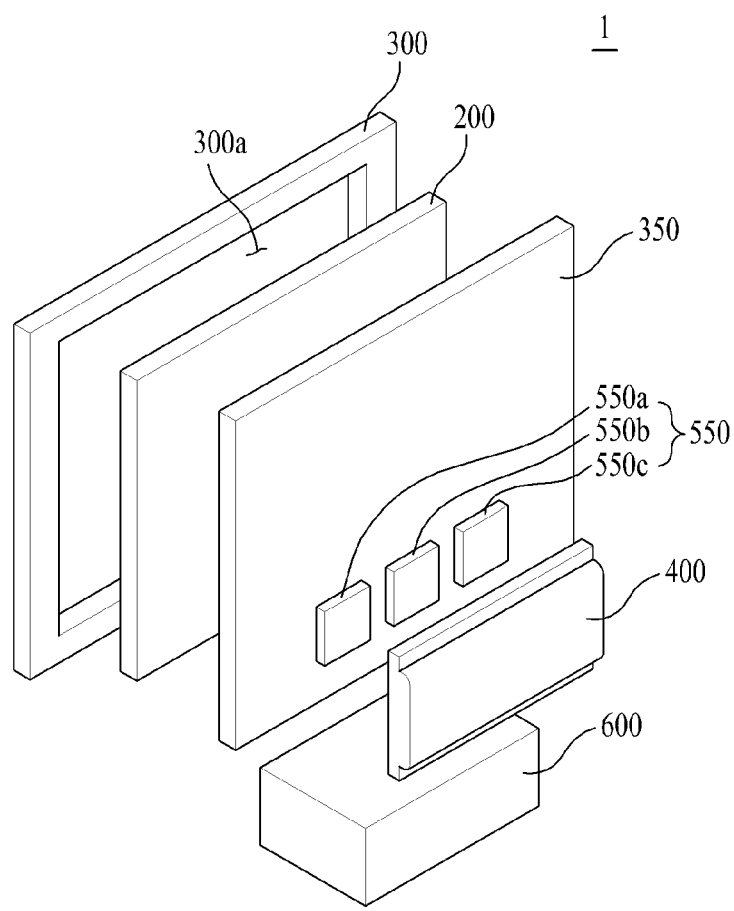
FIGS. 12 and 13 illustrate perspective views each showing a display device in accordance with an embodiment.
Figure 13:
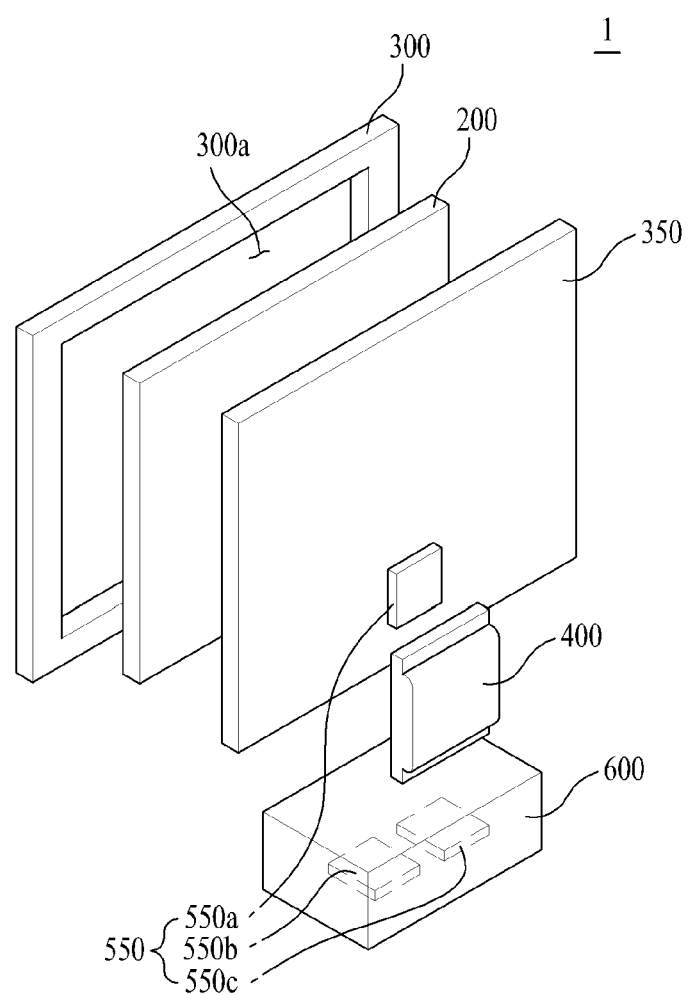

FIGS. 12 and 13 illustrate perspective views of display devices in accordance with embodiments, respectively.

Referring to FIG. 12, the display device 1 may include a display module 200, a front cover 300 and a back cover 350 which enclose the display module 200, a driving unit 550 provided to the back cover 350, and a driving unit cover 400 which covers the driving unit 550.

The front cover 300 may include a front panel (Not shown) of a transparent material which transmits a light, for protecting the display module 200 with a space therebetween, and transmitting the light from the display module 200 to let an image displayed on the display module 200 visible from an outside of the display device.

Or, the front cover 300 may be a flat plate without a window 300a.

In this case, the front cover 300 may be formed of a transparent material which transmits a light, for an example, by injection molding of plastic.

If the front cover 300 is formed of the flat plate thus, a frame may be removed from the front cover 300.

The back cover 350 is coupled to the front cover 300 for protecting the display module 200.

The driving unit 550 may be arranged on one side of the back cover 350.

The driving unit 550 may include a driving control unit 550a, a main board 550b, and a power supply unit 550c.

The driving control unit 550a may be a timing controller, and is a driving unit for controlling operation timing of various drivers of the display module 200, the main board 550b is a driving unit for transmitting a V sync, an H sync, and R, G, B resolution signals to the timing controller, and the power supply unit 550c is a driving unit for applying power to the display module 200.

The driving unit 550 may be provided to the back cover 350 enclosed with the driving unit cover 400.

The back cover 350 may have a plurality of holes for connecting the display module 200 to the driving unit 550, and a stand 600 for supporting the display device 1.

Referring to FIG. 13, the driving control unit 550a of the driving unit 550 may be provided to the back cover 350, and the main board 550b and the power supply board 550c may be provided to the stand 600.

And, the driving unit cover 400 may enclose the driving unit 550 provided to the back cover 350, only.

Though the embodiment has the main board 550b and the power supply board 550c provided individually, the main board 550b and the power supply board 550c may be unified as one unit, but a configuration thereof is not limited to this.

As another embodiment, a display device, an indicating device, or a lighting system may be suggested, including the light guide plate, the reflector, and the light source module having the projection described in foregoing embodiments applied thereto, and, as an example, the lighting system may include lamps and street lights.

The lighting system may be used as a lighting lamp having a plurality of LEDs for obtaining a light, especially, as a buried light (Down light) buried in a ceiling or a wall with an opening side of a shade exposed.

Thus, the embodiments can provide uniform brightness by forming the projection on a side of the groove in the light guide plate and arranging the light source module in front of the projection, thereby removing shadows from between light sources.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting system comprising:
   a light guide plate having a groove;
   a light source module arranged in the groove,
   wherein the light source module comprises:
      a substrate having a top surface facing in a first direction of the light guide plate; and
      at least one light source disposed on the top surface of the substrate;
   a projection projected in a second direction from a side of the groove in the light guide plate toward the light source module for guiding a light from the light source module to the light guide plate, the second direction being perpendicular to the first direction; and
   a first reflector disposed on the top surface of the substrate.

2. The lighting system according to claim 1, wherein the light guide plate and the projection are formed of the same material.

3. The lighting system according to claim 1, wherein the light guide plate and the projection are formed of materials different from each other.

4. The lighting system according to claim 1, wherein the light guide plate and the projection are formed of at least one selected from the group consisting of PMMA(Polymethylmethacrylate), PET(polyethylene terephthalate), COC(Cyclic Olefin Copolymers), PEN(polyethylene naphthalate), PC(Polycarbonate), PS(Polystyrene), and MS(Methacrylate styrene).

5. The lighting system according to claim 1, wherein the projection is projected from the side of the groove toward the light source module by 1 mm~10 mm.

6. The lighting system according to claim 5, wherein the at least one light source comprises a plurality of light sources and the projection has a length which becomes shorter as a distance between the plurality of light sources of the light source module becomes shorter, and vice versa.

7. The lighting system according to claim 1, wherein the projection has an upper side sloped from a horizontal plane by a first angle, and the projection has an underside sloped from a horizontal plane by a second angle, wherein the first angle and the second angle are different from each other.

8. The lighting system according to claim 7, wherein the first angle is larger than the second angle.

9. The lighting system according to claim 1, wherein at least one of an upper side and an underside of the projection is a flat surface vertical to the side of the groove, or a sloped surface sloped by a predetermined angle from the side of the groove.

10. The lighting system according to claim 1, wherein an upper side and an underside of the projection are parallel to each other.

11. The lighting system according to claim 1, wherein the projection includes a first side facing the light source module and a second side facing the side of the groove, wherein the first side of the projection has an area smaller than an area of the second side of the projection.

12. The lighting system according to claim 11, wherein the first side of the projection has a height higher than a height of the at least one light source of the light source module.

13. The lighting system according to claim 11, wherein the first side of the projection is spaced from, or in contact with, the light source of the at least one light source module.

14. The lighting system according to claim 11, wherein a ratio of a height of the second side of the projection to a height of the groove in the light guide plate is 1:1~3.

15. The lighting system according to claim 1, wherein a ratio of the height of the groove in the light guide plate to a thickness of the light guide plate 0.3~0.9:1.

16. The lighting system according to claim 1, wherein the substrate is disposed on an underside of the projection.

17. The lighting system according to claim 1, further comprising a second reflector arranged on at least one of an upper side of the projection or an inside of the groove in the light guide plate.

18. The lighting system according to claim 17, wherein at least one of the first reflector or the second reflector has a roughness pattern.

19. The lighting system according to claim 1, further comprising a stopper arranged in the groove in the light guide plate for fastening the light source module thereto.

20. A display device with a comprising:
a display panel;
a light guide plate having a groove;
a light source module arranged in the groove,
wherein the light source module comprises:
    a substrate having a top surface facing in a first direction of the light guide plate; and
    at least one light source disposed on the top surface of the substrate and emitting a light for the display panel;
a projection projected in a second direction from a side of the groove in the light guide plate toward the light source module for guiding a light from the light source module to the light guide plate, the second direction being perpendicular to the first direction; and
a reflector disposed on the top surface of the substrate.

* * * * *